United States Patent

Burk

[15] 3,696,483
[45] Oct. 10, 1972

[54] METHOD AND APPARATUS FOR FINISHING AN ANTIFRICTION-BEARING RACEWAY

[72] Inventor: Charles R. Burk, Collinsville, Conn.
[73] Assignee: Textron Inc., Providence, R.I.
[22] Filed: Jan. 21, 1971
[21] Appl. No.: 108,463

[52] U.S. Cl. ............................... 29/90, 29/148.4 R
[51] Int. Cl. ......................................... B24b 39/00
[58] Field of Search ............. 29/90, 148.4 R, 148.4 A

[56] References Cited

UNITED STATES PATENTS

| | | | |
|---|---|---|---|
| 3,242,567 | 3/1966 | Adam et al. | 29/90 X |
| 3,350,762 | 11/1967 | Koppelmann | 29/90 |

*Primary Examiner*—Leonidas Vlachos
*Attorney*—Sandoe, Hopgood and Calimafde

[57] ABSTRACT

The invention contemplates a method of burnishing a raceway surface for balls or like elements in an antifriction bearing, wherein the burnishing proceeds on a machined raceway surface, in the course of radially compressing an antifriction element between a reference raceway and the unfinished raceway, all while maintaining continuous rolling contact of the element in the two raceways. A specific tool illustrates use of the method in application to ball-bearing races, one embodiment being shown for such finishing of the raceway of an inner-bearing ring, and another embodiment being shown for such finishing of the raceway of an outer-bearing ring. In either event, the method is illustratively performed on an automatic screw machine, after the raceway has been turned at the end of tubular stock, and prior to the cut-off operation which severs the machined and burnished bearing ring from remaining tubular stock.

19 Claims, 3 Drawing Figures

PATENTED OCT 10 1972 3,696,483

INVENTOR
CHARLES B. BURK
BY
Sandoe, Hopgood & Calimafde
ATTORNEYS

METHOD AND APPARATUS FOR FINISHING AN ANTIFRICTION-BEARING RACEWAY

This invention relates to a method and to tooling for finishing the raceway surfaces of antifriction bearings, such as ball bearings.

Conventional bearings of the character indicated employ inner and outer bearing rings, with radially opposed raceways and plural antifriction elements in spaced relation from each other and having rolling contact with both raceways. The bearing rings are usually formed from tubular stock, in automatic screw machines, and the raceways are generated as one of the turning operations; after cut-off and such heat-treating as may be required in particular cases, the finishing operations include special grinding of the raceways. There is necessarily much handling and special-purpose machinery, giving rise to a substantial element of cost in the completed bearing.

In other, less expensive bearing constructions, a specially contoured roller is supported for free rotation on its axis and is pressed into the machined raceway to burnish the same, as a substitute for or to reduce the complexity of achieving a ground finish. But in such operations, excessive force must be applied, and this is not without creating undue distortion or growth in the ring itself, thus presenting a problem of holding desired tolerances in finished raceway dimensions.

It is an object of the invention to provide a method and means whereby bearing-raceway finishing may be simplified, so that cost may be reduced, as compared to conventional practice.

A specific object is to provide an improved method and means for finishing a bearing raceway without grinding.

It is also a specific object to provide an improved method and means for finishing a ball raceway to more reliably held, and relatively close, dimensional tolerances.

Another specific object is to meet the above objects with a method and means applicable to an automatic screw machine, so that the raceway can be finished before cut-off from remaining stock material.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

Briefly stated, the invention contemplates a method of burnishing a raceway surface for balls or like elements in an antifriction bearing, wherein the burnishing proceeds on a machined raceway surface, in the course of radially compressing an antifriction element between a reference raceway and the unfinished raceway, all while maintaining continuous rolling contact of the element in the two raceways. A specific tool illustrates use of the method in application to ball-bearing races, one embodiment being shown for such finishing of the raceway of an inner-bearing ring, and another embodiment being shown for such finishing of the raceway of an outer-bearing ring. In either event, the method is illustratively performed on an automatic screw machine, after the raceway has been turned at the end of tubular stock, and prior to the cut-off operation which severs the machined and burnished bearing ring from remaining tubular stock.

Figure 1:
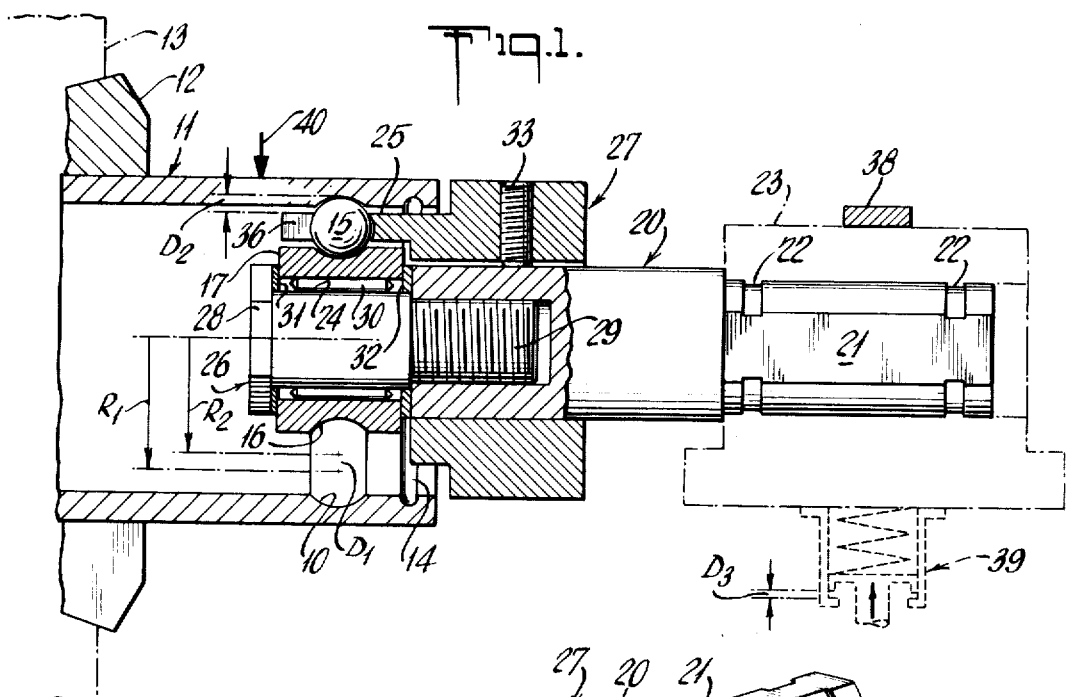
FIG. 1 is a view in elevation, partly broken and in longitudinal section, showing the invention in application to the finishing of a ball raceway for an outer bearing ring.
Figure 2:
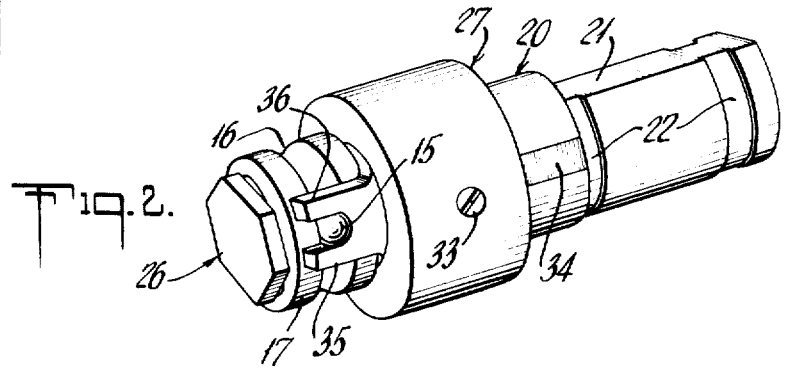
FIG. 2 is a perspective view of the tool of FIG. 1.

FIGS. 1 and 2 illustrate the invention in application to the finishing of a machined ball raceway 10 in what is destined to become the outer bearing ring of a ball bearing. In the situation depicted in FIG. 1, a length of tubular stock 11 is chucked by collet means 12 of an automatic screw machine and is being rotated, with a small working length projecting (to the right, in the sense of FIG. 1) beyond the face 13 of the machine. Normal cutting operations in this chucked condition have already produced the machined raceway 10 and a groove 14 for ultimate retention of a shield or seal, and the raceway-finishing step of the invention has already begun. This step comprises local radial compression of a hardened ball 15 between the raceway 10 and the raceway 16 of a hardened inner bearing ring 17. The bearing ring 17 is supported for free rotation, as dictated by driven rotation of the stock 11 and pure rolling contact of ball 15 with both raceways 10–16.

The sectional contour of the raceway 16 has, of course, been selected for compatibility with that of the raceway 10, as has also the diameter of ball 15. Furthermore, the radius $R_1$ of the circular locus of ball centers for balls riding the raceway 10 preferably has been selected to exceed the corresponding radius $R_2$ for the raceway 16, by an amount $D_1$, to allow clearance for tool-to-work entry; in FIG. 1, heavy dots identify the lower intercepts of the respective loci of ball centers, for the two raceways 10–16.

As shown, the tool of the invention comprises an elongated body 20 having a reduced end with suitable flat and groove formations 21–22 to enable secure mounting and orientation in tool-holder means, forming part of the screw machine and suggested by phantom outline 23. The body 20 also includes a stud portion 24 for free rotational support of the inner bearing ring 17 and a retaining portion 25 for holding the angular location at which the ball 15 is allowed to rotate; as shown, the stud portion 24 is formed as a cylindrical length of a separate part 26, and the retaining portion 25 is formed as the local axial projection of a separate part 27.

The ring-supporting part 26 has an externally exposed head or radial flange 28, adjacent the cylindrical stud portion 24; the length of portion 24 exceeds the axial width of bearing ring 17 and terminates at a shoulder, between portion 24 and the reduced threaded end 29 of part 26. Needle rollers 30 are shown riding the cylindrical portion 24 and the bore of bearing ring 17, to provide free antifriction rotational support thereof. It will be understood that the shoulder of part 24 is driven tight against body 20, by threaded engagement at 29 with a tapped bore in body 20, and that wrench flats in head 28 may assure such assembly. Preferably, washer means 31–32 at the respective ends of ring 15 are provided with a degree of axial freedom, to allow ball 15 an opportunity to find its correct radial plane of burnishing contact with raceway 10.

The ball-retaining part 27 is a sleeve securely mounted on the cylindrical exterior of body 20, in substantial axial overlap therewith. A set screw 33 is shown as the means for removably securing the relationship and for angularly determining the location of the ball-retaining projection 25, if desired, a local flat 34 (FIG. 2) in the body exterior can better determine and hold this relationship. As shown, projection 25 is forked, to define two angularly spaced fingers 35–36, transverse to the raceway 16 and contoured for retaining clearance with the ball 15. The radial thickness of the projection 25 is substantially less than the ball diameter, to permit adequate clearance with bearing ring 17 and the bore of stock 11, as shown; and the extent $D_2$ by which ball 15 (supported by ring 17) projects radially beyond the retaining means 25 is preferably substantially the previously identified extent $D_1$ by which the race radii differ.

In the drawings, for the sake of simplicity, no particular character detail has been shown for the opposed adjacent sidewall faces of the ball-retaining fingers 35–36. However, it will be understood that such formations are within the skill of the art, should orientation present a problem of ball retention while the tool, with its ball 15, is withdrawn from the work 11, as to permit other machining and cut-off operations. The present drawing does, however, illustrate that such special sidewall formations are not needed if the tool orientation always maintains a substantially upward positioning of ball 15 above ring 17; in other words, gravity action is enough, in conjunction with the lateral stability afforded by fingers 35–36. Moreover, the illustrated form has the advantage of easy access to permit removal of ball 15, as for periodic size inspection and/or replacement.

In use, the tool holder 23 will be understood to be suitably slide-mounted and actuated by the screw machine to provide a cycle of ball-positioning displacement. The cycle, of course, begins and ends in an axially retracted position (not shown), wherein the entire tool of FIG. 2 is axially separated from the work 11; in this retracted position the ball 15 is also radially retracted by a sufficient amount (generally less than $D_1$ or $D_2$) to clear the raceway 10 and the bore of stock 11. Thus, commencing with the situation shown in FIG. 1, and assuming that a ball-burnishing operation is complete, the tool-retraction cycle comprises a first vertically downward displacement of toolholder 23, to an extent usually less than $D_1$ or $D_2$, to allow ball 15 to clear the work 11. This is followed by axial separating displacement to axially clear the work, as to enable the indexing of tools or work spindles, should the screw machine be of the multiple-spindle variety. When the machined race of the next piece is ready for burnishing, the tool is first returned axially to its working location, and then tool holder 23 is elevated, as through a feed mechanism which includes yieldable means (suggested at 39), to abutment with a fixed stop 38, while the work is rotating. In the course of this upward feed stroke, initial ball contact is made with the unfinished raceway 10, causing automatic corrective axial location of the ball (if necessary), as permitted by end clearance of ring 17 at washers 31–32. The ball is allowed to work its way to a finish position in the raceway 10 as determined by the small lost-motion clearance $D_3$ through which preloaded feed is accomplished by means 39, in reference to the fixed stop 38. In practice, I have found it possible to achieve accurately finished raceway 10 dimensioning, within closely held tolerances, if the ball 15 is held in such contact for the normal cycle time afforded other-station cutting operations on a multiple-spindle screw machine; for example, loaded ball contact at 10, for a normal station cycle of 10 seconds, is perfectly adequate to finish (by burnishing) the raceway 10 in a 2-inch diameter bore of "52100" tubular steel stock, at a stock-rotating speed of 250 rpm.

Once the ball-burnishing operation is complete, and assuming completion of other screw-machine operations, including cut-off at 40, the now-severed machined outer bearing ring is subjected to other finishing operations, including hardening, and polishing, as may be required for the particular end use.

Figure 3:
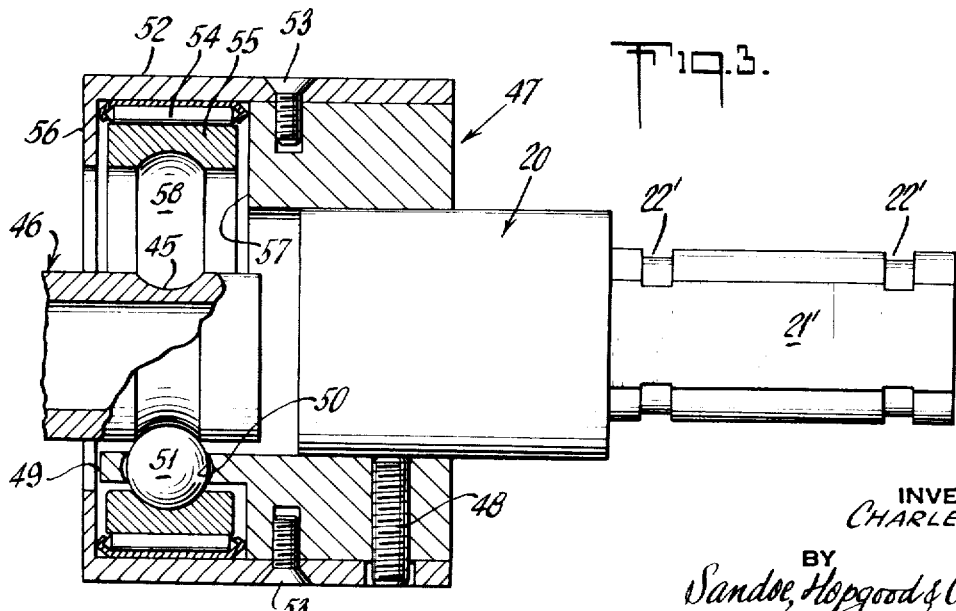
FIG. 3 is a view similar to FIG. 1 to illustrate application to the finishing of a ball raceway for an inner bearing ring.

FIG. 3 illustrates application of the invention to similar ball-burnishing of the unfinished (inner-ring) raceway 45 which has been machined near the end of tubular stock 46; stock 46 may be supported and driven by the collet of a screw machine, as previously described. The tool of FIG. 3 is shown with body structure 20', including mounting formations 21' – 22', as also previously described. A first sleeve part 47 is removably secured, as by set-screw means 48, to the cylindrical part of body 20, and the sleeve part 47 includes a local axially projecting ball-retaining formation 49, shown with a ball pocket 50 which clears the ball 51 but nevertheless presents local lug projections at the inner radial limit of formation 49, to retain the ball 51 against radial loss when the tool is disengaged from the work; the nature of such formations will be understood to present slight interference to the ball 51 when it is first inserted into pocket 50, so that radial pressure will overcome the interference and enable loose detent retention in the pocket 50. The assembly is completed by an outer sleeve 52, secured by means 53 to sleeve 47, and carrying a needle-roller assembly 54 by which a hardened outer bearing ring 55 is revolubly positioned. A flange 56 (on sleeve 52) and shoulder 57 on sleeve 47 are axially spaced for clearance with ring 55, to allow the latter a degree of freedom to adapt itself to the correct radial plane of ball-burnishing, at raceway 45.

The cycle of operation of the tool of FIG. 3 is precisely as described for FIG. 1, except that, of course, work-feed of the ball 51, compressionally loaded by the hardened raceway 58 against the unfinished raceway 45, is in the radially inward direction.

It will be seen that the described method and tool meet all the stated objects. It is believed that greater reliability of finishing to closer tolerances results from the facts that (a) a hardened ball (15, 51) is selected with a diameter specifically related to the ultimate ball diameter requirement of the bearing (e.g., ball 15 of 2 percent greater diameter than the diameter of balls used in the finished bearing), (b) a ball will produce its local deformation of the work with a lesser feed force than required by a roller (due to smaller contact area and, hence, substantially greater contact stress, i.e., applied force per unit area), and (c) the ball (15, 51) will utilize its entire spherical surface in the course of time (as distinguished from a roller, which is confined to a single axis of rotation).

The tool utilizes inexpensive components which are readily available, and a given tool lends itself to production of a range of different raceway curvatures, depending upon the ball (15, 51) size selected for retention in the tool. Use of the invention on automatic screw machines has produced raceways with smooth surfaces, free of machining marks and turning lines, and to close tolerances; no measurable ring growth occurred for parts so finished, and the effect on other machining operations was insignificant. Even the ball (15, 51) and its pocket or retainer show little wear, and, of course, ball inspection and/or replacement are readily accomplished.

While the invention has been described in detail for the preferred method and embodiments shown, it will be understood that modifications may be made without departing from the invention.

What is claimed is:

1. A tool for burnishing an unfinished antifriction raceway, comprising an elongated body with means for fixedly mounting the same in a given orientation, an antifriction-bearing ring having a raceway substantially complementary to the raceway to be burnished and means on said body supporting said ring for free rotation on its axis and with the raceway of said ring facing radially away from the rotary support thereof, the curvature of said raceways being compatible with rolling-contact support of an antifriction element of a given diameter, and retainer means fixedly carried by said body and including element-retaining means projecting axially into radially overlapping clearance relation with said ring raceway; the projecting part of said retaining means being of such limited radial extent with respect to said axis that an antifriction element of said diameter riding said ring raceway and located by said retaining means will project radially clear of said retaining means to an extent exceeding the radial depth of the unfinished raceway; whereby the unfinished raceway may be burnished by rotating the same about its axis while radially eccentrically forcing the element-equipped tool into the unfinished raceway on substantially the radial alignment of the retained element.

2. The tool of claim 1, in which said element is a ball and said raceways are ball raceways.

3. The tool of claim 1, in which said bearing ring is an inner ring with a radially outwardly facing raceway, said element being positioned by said retaining means at a given angular location and projecting radially outwardly for operation on a radially inwardly facing unfinished raceway.

4. The tool of claim 1, in which said bearing ring is an outer ring with a radially inwardly facing raceway, said element being positioned by said retaining means at a given angular location and projecting radially inwardly for operation on a radially outwardly facing unfinished raceway.

5. The tool of claim 1, in which said body includes a cylindrical portion, and in which said retaining means comprises a ring having a bore fitted to said cylindrical portion, and means for adjustably securing said last-mentioned ring to said body.

6. The tool of claim 3, in which said body includes an axially projecting stud portion, and antifriction-bearing means supporting said inner bearing ring for free rotation on said stud portion.

7. The tool of claim 6, in which said stud portion is a separate part, threadedly engaged to the remainder of said body.

8. The tool of claim 7, in which said stud part includes an axially outer radial flange and a shoulder at the end of the threaded portion, the spacing between said flange and shoulder exceeding the axial length of said antifriction-bearing means.

9. The tool of claim 8, in which said antifriction-bearing means includes a plurality of roller elements.

10. The tool of claim 4, in which said body includes an axially projecting sleeve portion, and antifriction-bearing means supporting said outer bearing ring for free rotation within said sleeve portion.

11. The tool of claim 10, in which said sleeve portion is a separate part and means removably securing the same to the remainder of said body.

12. The tool of claim 11, in which said sleeve part includes an axially outer radial flange which is axially spaced from the remainder of said body to an extent exceeding the axial length of said antifriction-bearing means.

13. The tool of claim 12, in which said antifriction bearing means includes a plurality of roller elements.

14. The method of burnishing the unfinished raceway of ball ball-bearing ring, which comprises selecting a ball-bearing ring having a raceway having a curvature compatible with that of the unfinished raceway, said selected ring having a characteristic radius of ball-center support which is so materially different from the radius of ball-center support which is characteristic of the unfinished raceway that a ball in one raceway and centered on one of said radii will clear the other raceway sidewall when axially overlapped therewith, supporting the selected ring for free rotation, rotationally driving the unfinished ring, retaining a ball at substantially a fixed angular location about the bearing-ring axis, and radially compressing the ball between said raceways on a radially directed alignment substantially at the fixed angular location, whereby the ball-bearing ring may be driven in rotation by the rotation of the ball as it tracks and burnishes the rotating unfinished raceway.

15. The method of making a ball-bearing ring, which comprises selecting a tubular element and forming a ball-raceway groove therein, selecting a ball-bearing ring with a raceway groove of curvature compatible with that of the formed ball-raceway groove, selecting a ball of diameter compatible with the curvature of the raceways and inserting the same between raceways at a given angular location, radially compressionally stressing said selected ring and stock via said ball, supporting the stock and the selected ring for relative rotation while thus compressionally stressed, and retaining the ball at the angular location of such compressional loading.

16. The method of claim 15, in which said tubular stock is relatively ductile and said selected ring and ball are relatively hard.

17. The method of claim 16, and including the further step of hardening 16 the burnished element.

18. The method of claim 15, wherein the tubular element is a piece of stock of axial length exceeding the length of the bearing ring to be produced, chucking the tubular element in such manner as to project at least an end including the formed raceway and to an extent exceeding the length of the bearing ring to be produced, and cutting off to said length after burnishing the formed raceway groove.

19. The method of claim 18, wherein the rotation is effected by rotating said chuck.

* * * * *